United States Patent [19]
Pickett et al.

[11] Patent Number: 5,382,401
[45] Date of Patent: Jan. 17, 1995

[54] EXTRUSION DIE STABILIZER GUIDE AND METHOD OF EXTRUSION

[75] Inventors: Thomas J. Pickett, Troy; Richard A. Otten, Warren; Bruce J. Stribbell, Rochester; Manhar K. Sheth, Troy, all of Mich.

[73] Assignee: General Motors Corporation, Detroit, Mich.

[21] Appl. No.: 103,957

[22] Filed: Aug. 10, 1993

[51] Int. Cl.⁶ ............................................. B29C 47/12
[52] U.S. Cl. ..................... 264/177.16; 156/244.12; 264/177.2; 425/114; 425/461
[58] Field of Search ........... 264/177.1, 177.16–177.20; 425/113, 114, 461; 156/244.12, 244.22

[56] References Cited

U.S. PATENT DOCUMENTS

| | | | |
|---|---|---|---|
| 2,754,543 | 7/1956 | Loew | 425/114 |
| 3,081,213 | 3/1963 | Chinn | 425/113 |
| 3,531,829 | 10/1970 | Skobel et al. | 425/113 |
| 3,813,199 | 5/1974 | Friesner | 425/113 |
| 3,888,713 | 6/1975 | Alderfer | 156/244.12 |
| 3,944,459 | 3/1976 | Skobel | 425/113 |
| 4,087,223 | 5/1978 | Angioletti et al. | 425/114 |
| 4,274,821 | 6/1981 | Kiemer | 425/113 |
| 4,563,141 | 1/1986 | Zoller | 425/114 |
| 4,778,367 | 10/1988 | Hilakos | 425/113 |

Primary Examiner—Jeffery R. Thurlow
Attorney, Agent, or Firm—William A. Schuetz; Jeffrey A. Sedlar

[57] ABSTRACT

A stabilizer guide for guiding a stabilizer, having a material characteristic of fraying, through an extrusion die without fraying and melting the stabilizer during the extrusion of a thermoplastic body molding of a motor vehicle. The stabilizer guide is made up of two halves that join to form a parting line and a slot by which to guide the stabilizer through the extrusion die. The slot extends along the entire length of the stabilizer guide and is located in a different plane than the parting line of the stabilizer guide. By having the slot in a different plane than the parting line, the stabilizer is prohibited from wandering into the parting line. This prevents the stabilizer from fraying and shredding and causing the slot to be obstructed by pieces of the stabilizer. Obstruction of the slot hampers the stabilizer from being guided through the stabilizer guide.

8 Claims, 3 Drawing Sheets

EXTRUSION DIE STABILIZER GUIDE AND METHOD OF EXTRUSION

The present invention relates to extruded thermoplastic body moldings for a vehicle and, more particularly, to a stabilizer guide that guides a stabilizer, having the material characteristic of fraying, through an extrusion die without fraying and melting the stabilizer during the extrusion of the thermoplastic vehicle body molding.

BACKGROUND OF THE INVENTION

It is well known to use a stabilizer when extruding a thermoplastic vehicle body molding such as a side molding for a motor vehicle. The stabilizer is molded within the thermoplastic vehicle body molding and is utilized to control shrinkage and thermal expansion of the thermoplastic. A rigid metallic stabilizer, such as aluminum, is commonly utilized due to the fact that its rigidity aids in the extrusion process.

In extruding a thermoplastic vehicle body molding, a two piece stabilizer guide is seated within an extrusion die. The guide comprises two pieces to allow for occasional disassembly and cleaning. The two pieces of the guide abut one another to form a parting line, and a slot is formed that extends the length of the guide and lies in the same horizontal plane as the parting line. The stabilizer is fed through the slot until it exits the guide inside the extrusion die where a thermoplastic material surrounds the stabilizer. The thermoplastic vehicle body molding is then extruded into its final form.

Typically, the metallic stabilizer is a solid sheet of material having a sheet metal thickness and a width narrower than the extruded body molding. When being guided through the slot, the stabilizer may wander into the parting line. The solid sheet of metallic stabilizer does not fray when wandering into the parting line, and therefore, the use of a rigid metallic stabilizer does not generate small frayed pieces that may melt and effect the extrusion process.

The disadvantage of a metallic stabilizer is that the metal adds weight to the thermoplastic vehicle body molding as well as adding cost due to the primer treatment that is required on the metallic stabilizer in order that it may adhere to the thermoplastic. Also, the metallic stabilizer remains visible at the ends of the thermoplastic vehicle body molding which results in the body molding being aesthetically unpleasing. The exposed metallic stabilizer may also produce an edge or corner that may snag or catch on various items during the assembly process.

Stabilizers, such as a non-metallic woven glass mesh, have recently been developed to cure the shortfalls of metallic stabilizers. The non-metallic stabilizers are lightweight, less expensive than metallic stabilizers, inconspicuous and aesthetically pleasing while still being effective in preventing shrinkage and thermal expansion of the thermoplastic vehicle body moldings.

Due to the nature of such non-metallic woven glass mesh stabilizers, processing these stabilizers in the extruding of the thermoplastic vehicle body molding is difficult. As set forth above, the stabilizer guide typically has two halves so that the guide may be disassembled and cleaned on a periodic basis. The horizontal parting line that is created by the abutting halves of the stabilizer presents a problem when utilized with a stabilizer that has a tendency to fray, such as the woven glass mesh. The stabilizer has the propensity to wander into the parting line of the guide, and as a result, the stabilizer becomes frayed and shredded along its edges, sometimes leading to the stabilizer pulling apart. The loose pieces of the stabilizer that shred or fray from the edges of the stabilizer remain in the stabilizer guide and extrusion die and melt from the heat of the extrusion process. When this occurs, the slot becomes obstructed by the melted shreddings of the stabilizer, and the stabilizer is prevented from being fed through the stabilizer guide. This can lead to a shutdown in the extrusion process thus requiring the disassembly and cleaning of the stabilizer guide and the extrusion die. Such shutdowns are costly and inefficient and are not desirable on a production basis.

SUMMARY OF THE INVENTION

The present invention solves the above problem by providing a stabilizer guide that guides a stabilizer, having the material characteristic of fraying, through an extrusion die without fraying and shredding the stabilizer during the extruding of a thermoplastic vehicle body molding. The stabilizer guide is comprised of two halves that abut one another to form a parting line and a slot wherein the parting line is in a different plane than the slot. By having the slot and the parting line in different planes, the stabilizer is prohibited from wandering from the slot into the parting line, and therefore, the stabilizer is prevented from shredding or fraying. This in turn prevents any shredded pieces of the stabilizer from being left behind to melt within the stabilizer guide and the extrusion die and obstruct the slot and the extrusion die.

In one form of the invention, the stabilizer guide is formed of two halves having a male-female relationship. A first half of the stabilizer guide has a substantially rectangular recess extending the length of the guide and a width that accommodates the width of the stabilizer. A second half of the stabilizer guide has a ledge that extends downward from its bottom surface along the entire length of the guide. The ledge on the second half of the stabilizer guide has substantially the same width as the recess in the first half of the guide and has a thickness less than the depth of the recess in the first half of the guide. The two halves of the stabilizer guide are joined together so that the ledge extends into the recess to form a slot for guiding the stabilizer. The slot height is defined by the difference in the thickness of the ledge and the depth of the recess. The abutting surfaces of the two halves of the guide provide a horizontal parting line that is in a different horizontal plane than the slot. This prohibits the stabilizer from wandering into the parting line when the stabilizer is being guided through the stabilizer guide. Thus, the stabilizer is prohibited from fraying and shredding and causing the slot to be obstructed with melted pieces of stabilizer.

In an additional form of the invention, the two halves of the stabilizer guide have a U-shaped cross section wherein the open ends of the U-shape cross section abut one another to form a horizontal slot and a vertical parting line. Since the parting line is not in the same horizontal plane as the slot, the stabilizer is prohibited from wandering into the parting line upon the stabilizer being guided through the slot. This eliminates any fraying or shredding of the stabilizer that may be caused by the stabilizer wandering into the parting line.

In yet another form, a conventional stabilizer guide provides cavities at opposite ends of a first slot. A solid insert having a second slot therethrough is seated in each of the cavities at the ends of the first slot. The first slot is in communication with the second slot, and the stabilizer is guided through both slots. Since the inserts have no parting line, the stabilizer cannot wander and fray, as the second slots prohibit the stabilizer from wandering into the parting line of the first slot. The inserts are fabricated from a disposable material since the inserts cannot be disassembled and cleaned.

To this end, the object of the present invention is to provide a new and improved stabilizer guide that guides a stabilizer, having the material characteristic of fraying, through an extrusion die without fraying or melting the stabilizer when extruding the stabilizer within a thermoplastic body molding of a vehicle.

DESCRIPTION OF THE PREFERRED EMBODIMENT

Figure 1:
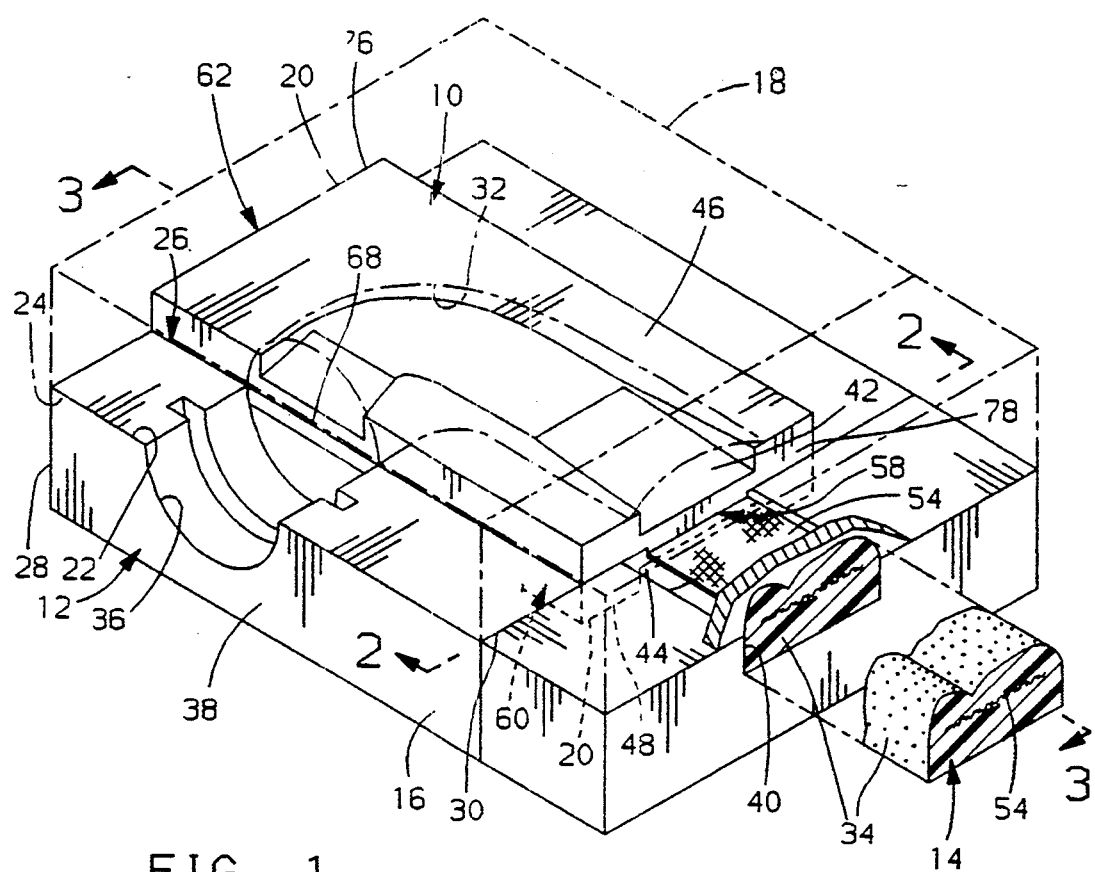
FIG. 1 is a perspective view with some parts cut away showing a stabilizer guide seated within an extrusion die and showing a stabilizer being fed through the stabilizer guide and exiting as part of an extruded thermoplastic body molding of a vehicle.

Referring to the drawings, the present invention will now be described in detail with reference to the preferred embodiment.

FIG. 1 shows the stabilizer guide 10 being utilized in an extrusion die 12 for the extruding of a thermoplastic vehicle body molding 14, such as a side molding for a motor vehicle (not shown). The extrusion die 12 is comprised of two halves 16, 18 that separate so that the interior of the extrusion die 12 is accessible for cleaning. Each half 16, 18 of the extrusion die has a recess 20 in abutting surfaces 22, 24 of the extrusion die 12 to form a substantially rectangular cavity 26 in the extrusion die 12. The stabilizer guide 10 is nested within the cavity 26 which extends from a front end 28 of the extrusion die 12 to a point 30 approximately three quarters along the length of the extrusion die 12.

Figure 2:
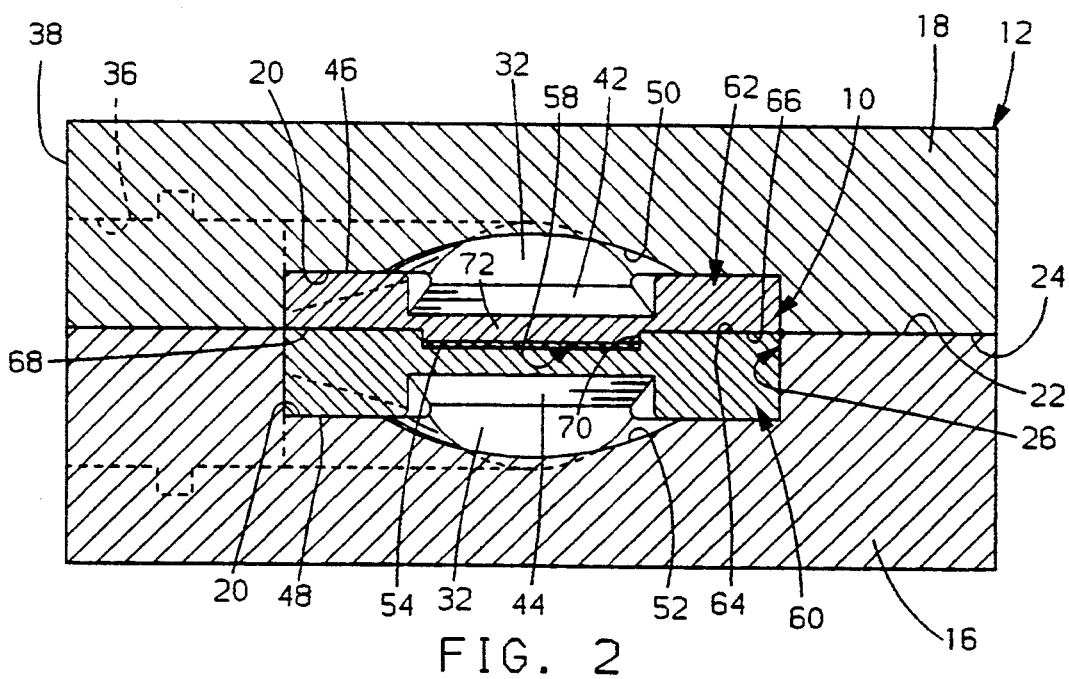
FIG. 2 is a section view in the direction of arrows 2—2 in FIG. 1 showing a stabilizer guide and a passage way in the extrusion die for directing the flow of thermoplastic through the extrusion die.

The extrusion die 12 provides a passage way 32 for the flow of a thermoplastic material 34. The passage way 32 begins with a substantially circular entrance 36 on a side 38 of the extrusion die 12, extends over and under the stabilizer guide 10, and continues through to an exit 40 of the extrusion die 12 wherein a finished form of the extruded body molding 14 is produced. The stabilizer guide 10 provides recesses 42, 44 on a top 46 and a bottom 48, respectively, of the stabilizer guide 10. These recesses 42, 44 combine with the passage way 32 to form two substantially semi-elliptical cross-sections 50, 52, as seen in FIG. 2. The recesses 42, 44 in the top 46 and the bottom 48 of the stabilizer guide 10 combine with the passageway 32 to direct flow of the thermoplastic material 34 through the extrusion die 12.

Figure 3:
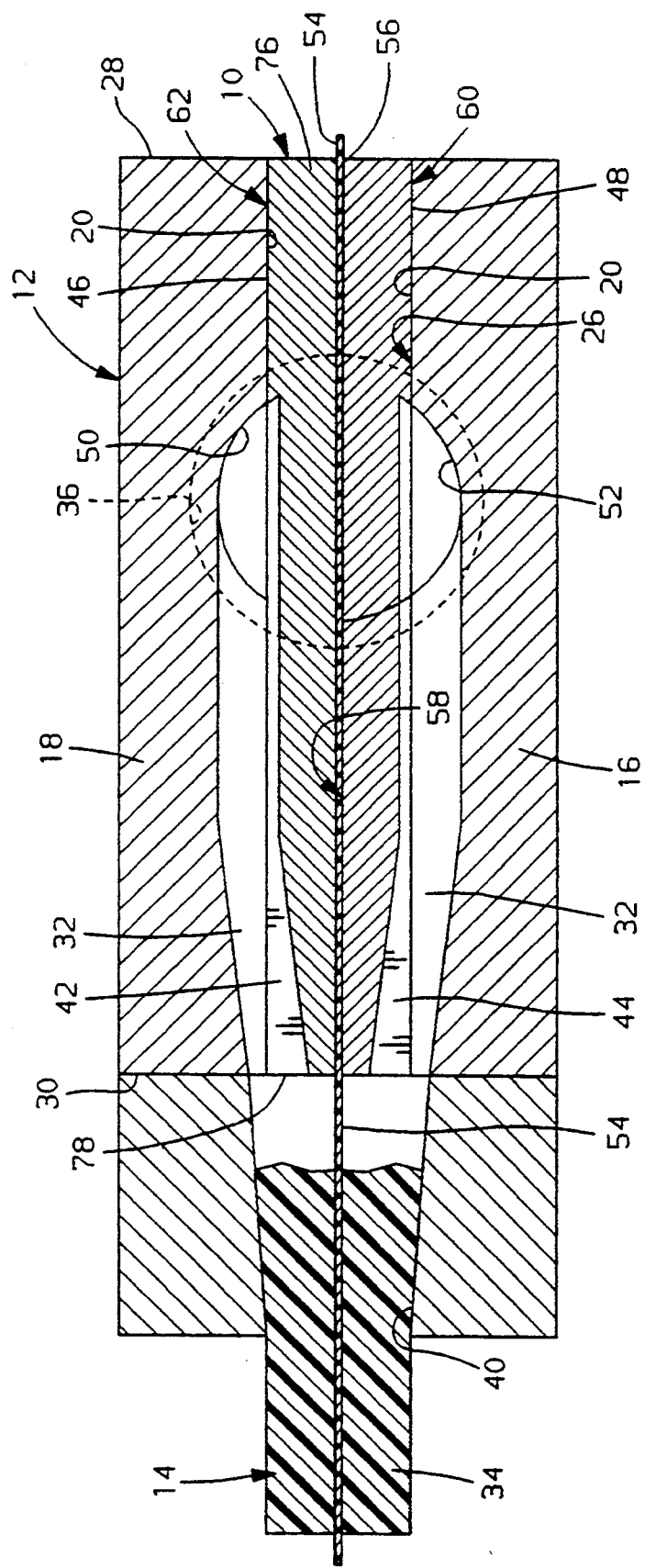
FIG. 3 is a section view in the direction of arrows 3—3 in FIG. 1 showing a stabilizer being guided through the stabilizer guide and being extruded within the thermoplastic body molding of a vehicle.

During the extruding of the thermoplastic vehicle body molding 14, a stabilizer 54 is fed through an entrance 56 of a slot 58 in the stabilizer guide 10, as seen in FIG. 3. The stabilizer 54 is fed along the length of the stabilizer guide 10 until the stabilizer 54 exits the slot 58 of the stabilizer guide 10 within the extrusion die 12.

The thermoplastic material 34 is poured into the entrance 36 of the passage way 32 in the side 38 of the extrusion die 12 and is forced along the passage way 32, as seen in FIG. 1. The flow of the thermoplastic material 34 is directed over the recesses 42, 44 in the top 46 and the bottom 48 of the stabilizer guide 10 until the thermoplastic material 34 reaches the end 30 of the stabilizer guide 10. The thermoplastic material 34 continues to be forced through the passage way 32 where it flows over and underneath the stabilizer 54 as the stabilizer 54 exits the slot 58 of the stabilizer guide 10 within the extrusion die 12. As the thermoplastic material 34 flows through the passage way 32 towards the exit 40 of the extrusion die 12, the flow of the thermoplastic material 34 pulls the stabilizer 54 through the slot 58 in the stabilizer guide 10, so both the thermoplastic material 34 and the stabilizer 54 move towards the exit 40 of the extrusion die 12. At the exit 40 of the extrusion die 12, the desired geometry of the vehicle body molding 14 is formed into the exit 40 of the extrusion die 12, and the thermoplastic material 34 exits the extrusion die 12 in the desired form of the vehicle body molding 14 with the stabilizer 54 being encapsulated within the thermoplastic vehicle body molding 14. The extruded vehicle body molding 14 is fed onto a moving belt (not shown) which allows the extruded vehicle body molding 14 to continue to exit the extrusion die 12 in a consistent and constant shape.

As seen in FIGS. 1 and 2, the stabilizer guide 10 comprises two halves 60, 62 having adjoining surfaces 64, 66 that form a parting line 68. When the slot 58 in the stabilizer guide 10 is in the same plane as the parting line 68, the stabilizer 54 has a tendency to wander into the parting line 68 when being pulled through the guide 10. When the stabilizer 54 is made of a material that frays, such as a non-metallic woven glass mesh, the wandering of the stabilizer 54 in the parting line 68 will cause the material to fray, thus causing small pieces of the stabilizer 54 to be left behind to melt in the stabilizer guide 10 and extrusion die 12 causing an obstruction to the extrusion process.

To prevent the stabilizer 54 from wandering into the parting line 68 of the stabilizer guide 10, Applicants have provided the two halves 60, 62 of the stabilizer guide 10 with a male-female relationship, as seen in FIG. 2. The first half 60 of the stabilizer guide 10 has a substantially flat top surface 64 with a substantially rectangular recess 70 cutting through the center-most portion of the top surface 64. The recess 70 extends the entire length of the stabilizer guide 10, and the width of the recess 70 is slightly larger than the width of the stabilizer 54.

The second half 62 of the stabilizer guide 10 has a ledge 72 that is integral with and extends downward from the substantially flat bottom surface 66. The ledge 72 is substantially rectangular and extends along the entire length of the stabilizer guide 10 in the center-most portion of the bottom surface 66. The ledge 72 height is less than and substantially the same width as the recess 70 in the first half 60 of the stabilizer guide 10. The two halves 60, 62 of the stabilizer guide 10 are joined together, so the ledge 72 mates with the recess 70 while the top surface 64 of the first half 60 and the bottom surface 66 of the second half 62 abut one another to form the horizontal parting line 68.

The substantially rectangular slot 58 is formed in the stabilizer guide 10 by having the ledge 72 extend into the recess 70 of the stabilizer guide 10. The height of the slot 58 is the difference in the height of the ledge 72 and the depth of the recess 70 and is established by design choice. The slot 58 lies in a horizontal plane lower than the parting line 68 created by the abutment of the top surface 64 of the first half 60 of the stabilizer guide 10 and the bottom surface 66 of the second half 62 of the stabilizer guide 10. By having the slot 58 in a different plane than the parting line 68 of the stabilizer guide 10, the stabilizer 54 cannot wander into the parting line 68 while being guided through the slot 58. This prevents the stabilizer 54 from fraying and shredding and having small pieces of stabilizer 54 left behind in the stabilizer guide 10 and the extrusion die 12 to melt, obstruct the slot 58 of the guide 10, and prevent the stabilizer 54 from being guided through the stabilizer guide 10.

Figure 4:
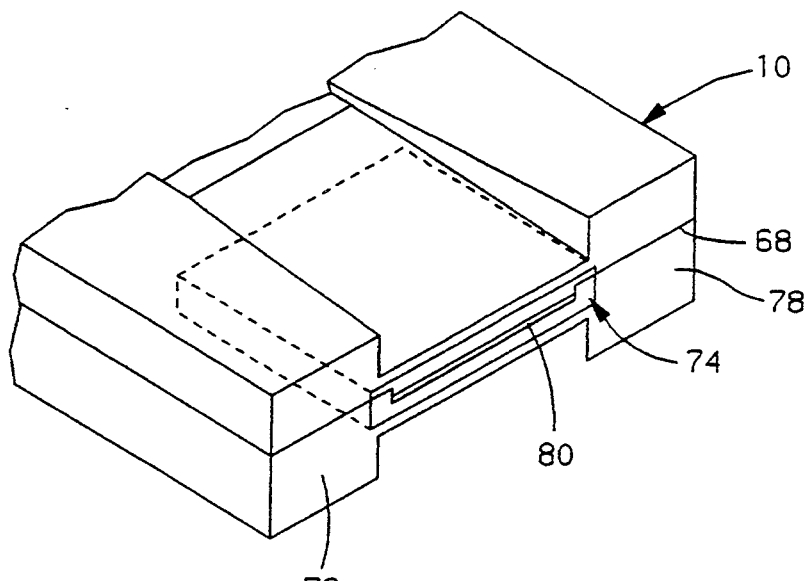
FIG. 4 is a perspective view of a partial cutaway of the stabilizer guide and showing a male-female insert in the stabilizer guide.

In an additional embodiment, as seen in FIG. 4, conventional stabilizer guides may be retrofitted by adding inserts 74, 82, 92 with the essential geometry for guiding the stabilizer 54 through the stabilizer guide 10 without fraying or shredding the stabilizer 54. A male-female geometry insert 74, having the male-female relationship previously described, may be utilized at the ends 76, 78 of the stabilizer guide 10 to prohibit the stabilizer 54 from wandering into the parting line 68 of the stabilizer guide 10. The slot 80 in the male-female geometry insert 74 remains in communication with the slot 58 in the stabilizer guide 10 to guide the stabilizer 54 through the stabilizer guide 10.

Figure 5:
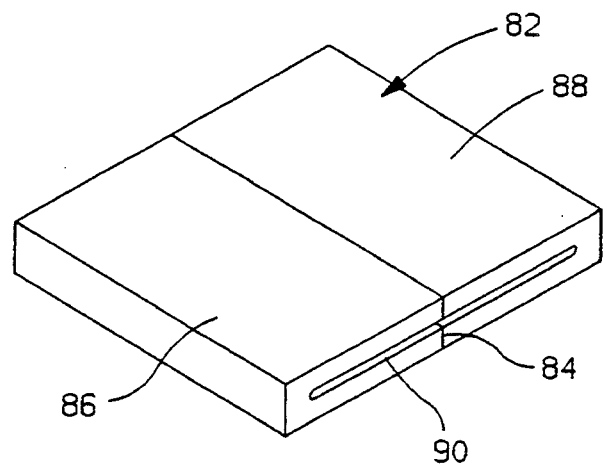
FIG. 5 is a perspective view showing an insert with a vertical parting line that is utilized in the hidden edge line area of the stabilizer guide shown in FIG. 4.

FIG. 5 shows an insert 82 with a vertical parting line 84 wherein the vertical parting line insert 82 is seated in the hidden edge line area of FIG. 4. The vertical parting line insert 82 comprises two halves 86, 88 having U-shaped cross sections. The open ends of the U-shaped cross section halves 86, 88 are joined to form a vertical parting line 84 and a horizontal slot 90. By having the slot 90 in a different plane than the parting line 84, the stabilizer 54 is prevented from wandering into the parting line 84 and causing fraying and shredding of the stabilizer 54.

Figure 6:
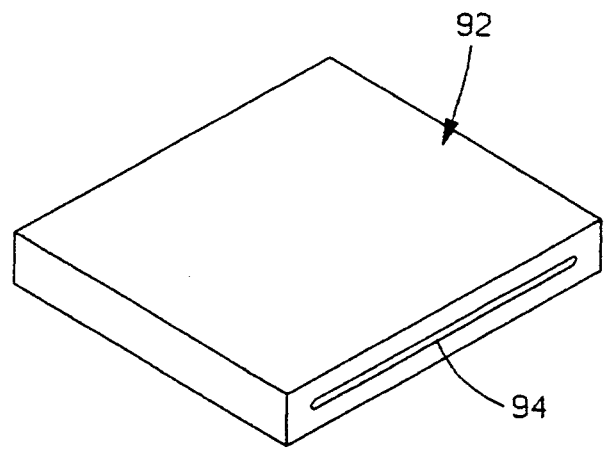
FIG. 6 is a perspective view of a one piece disposable insert that is utilized in the hidden edge line area of the stabilizer guide shown in FIG. 4.

FIG. 6 shows a one-piece insert 92 without a parting line. The one-piece insert 92 seats within the hidden edge line area shown in FIG. 4, and the slot 94 in the one-piece insert 92 remains in communication with the slot 58 in the stabilizer guide 10. Since the one-piece insert 92 has no parting line, the stabilizer 54 is prohibited from wandering out of the slot 94. The one-piece insert 92 is disposable since it cannot be disassembled to clean the slot 94.

It should be noted that the present invention is not limited to such geometries for the inserts 74, 82, 92 only, but rather, the geometries may extend along the entire length of the stabilizer guide 10. Also, the parting line 68, 84 geometries may take on any geometric configuration consistent with the limitation that the parting line of the stabilizer guide 10 lie in a different plane than the slot 58 utilized to guide the stabilizer 54 through the extrusion die 12.

It should be noted that the present invention is not limited to the disclosed geometries of the thermoplastic passage way 32 and of the recesses 42, 44 on the top 46 and the bottom 48 of the stabilizer guide 10, but rather, these geometries are dependent on the geometry of the final extruded vehicle body molding 14 and must be carefully balanced to provide proper flow of the thermoplastic material 34 around the stabilizer 54. Thus, it has been shown that the present invention provides a stabilizer guide that guides a stabilizer, having the characteristic of fraying, through an extrusion die without fraying or melting the stabilizer during the extruding of a thermoplastic body molding of a vehicle.

The embodiments of the invention in which an exclusive property or privilege is claimed are defined as follows:

1. An extrusion die for extruding a thermoplastic material encapsulating a stabilizer having a material characteristic of fraying, said extrusion die having a flow passage way with a die exit and comprising:
   a guide seated in said flow passage way of said extrusion die and having abutting surfaces that provide a parting line lying in a plane between said abutting surfaces;
   said guide having a slot for guiding said stabilizer through said extrusion die; said guide, in combination with said flow passage way defining flow paths around opposing sides of said guide, said guide having a slot exit at an end of said guide;
   said extrusion die's flow passage way, between said end of said guide and said die exit, defining an individual flow path wherein a flow of said thermoplastic material pulls said stabilizer through said guide; and said slot lying completely outside the plane of said parting line so that, when pulled, said stabilizer does not wander into said parting line.

2. An extrusion die as stated in claim 1 wherein said guide comprises two halves having a horizontal parting line.

3. An extrusion die as stated in claim 1 wherein said guide comprises two halves having a vertical parting line.

4. An apparatus for guiding a stabilizer, having a material characteristic of fraying, wherein said stabilizer is molded within a thermoplastic extrusion without fraying and melting comprising:
   an extrusion die;
   a guide seated in said extrusion die and having a first slot extending through said guide to guide said stabilizer through said extrusion die;
   said guide having a pair of similar cavities at opposite ends of said first slot; and
   a pair of similar inserts seated in said pair of similar cavities in said guide, and said inserts having a second slot extending through each insert, said second slot open on two opposing ends of each insert and enclosed therebetween, said second slot in communication with said first slot and said inserts having no parting line.

5. An apparatus for guiding a stabilizer, having a material characteristic of fraying, wherein said stabilizer is molded within a thermoplastic extrusion without fraying and melting said stabilizer comprising:
   an extrusion die having an exit and a cavity with a wall, said extrusion die having a passage way for the flow of a thermoplastic material, and said passage way being in communication with said cavity;

a guide seated in said cavity and having two mating halves that provide a substantially planar parting line between said halves and having recesses in the outer surfaces of said guide in communication with said passage way for guiding said thermoplastic material along said passage way between said outer surfaces and said cavity wall to said exit of said guide; and said guide having a substantially planar slot for guiding said stabilizer through said extrusion die, and said slot extending the length of said guide, and said slot lying completely in a different plane than said parting line so that said stabilizer does not fray, melt or obstruct said slot by wandering into the parting line.

6. An apparatus as stated in claim 5, wherein said two halves of said guide comprise:

a first half having a top surface and a recess extending downward from said top surface and having a width to accommodate said stabilizer and extending along the entire length of said first half;

a second half having a bottom surface and a ledge extending downward from said bottom surface, and said ledge having a width substantially the same size as said recess and having a height smaller than the depth of said recess in said first half; and said top surface of said first half abutting said bottom surface of said second half to form a parting line, and said ledge engaging and occupying a portion of said recess so that said slot is formed by a portion of said recess not occupied by said ledge.

7. An apparatus as stated in claim 5, wherein each of said two halves of said guide have a U-shaped cross section with the open ends of the U-shaped cross sections abutting one another so that said parting line is in a vertical plane, and said slot is in a horizontal plane.

8. A method of extruding a thermoplastic body molding encapsulating a stabilizer having the material characteristic of fraying within said thermoplastic body molding without fraying or melting said stabilizer, the steps comprising:

providing an extrusion die with a cavity extending from the front of said extrusion die to a point within said extrusion die, and said extrusion die having a passage way that extends from an entrance into said extrusion die to an exit out of said extrusion die converging with said cavity between said front and said point;

providing a two piece guide seated in said cavity of said extrusion die and having a parting line between said two pieces of said guide with a slot extending through the length of said guide so that said slot does not lie in the same plane as said parting line, and said guide having a recess in the top and the bottom of said guide which is in communication with said passage way;

inserting said stabilizer into said slot of said guide in said front of said extrusion die and feeding said stabilizer through said slot until said stabilizer exits said guide within said extrusion die;

pouring a thermoplastic material into said passage way at said entrance into said extrusion die; forcing said thermoplastic through said passage way and along said recesses in the top and the bottom of said guide to surround and encapsulate said stabilizer with said thermoplastic material upon said stabilizer exiting said slot of said guide pulling said stabilizer through said guide with said forced thermoplastic material; and extruding said thermoplastic encapsulated stabilizer through a pre-formed passage way at said exit of said extrusion die to obtain a desired geometry.

* * * * *